April 5, 1949.  O. E. CONKLIN  2,466,154
OPTICAL COLOR-SEPARATION PRINTER
Filed April 17, 1948.
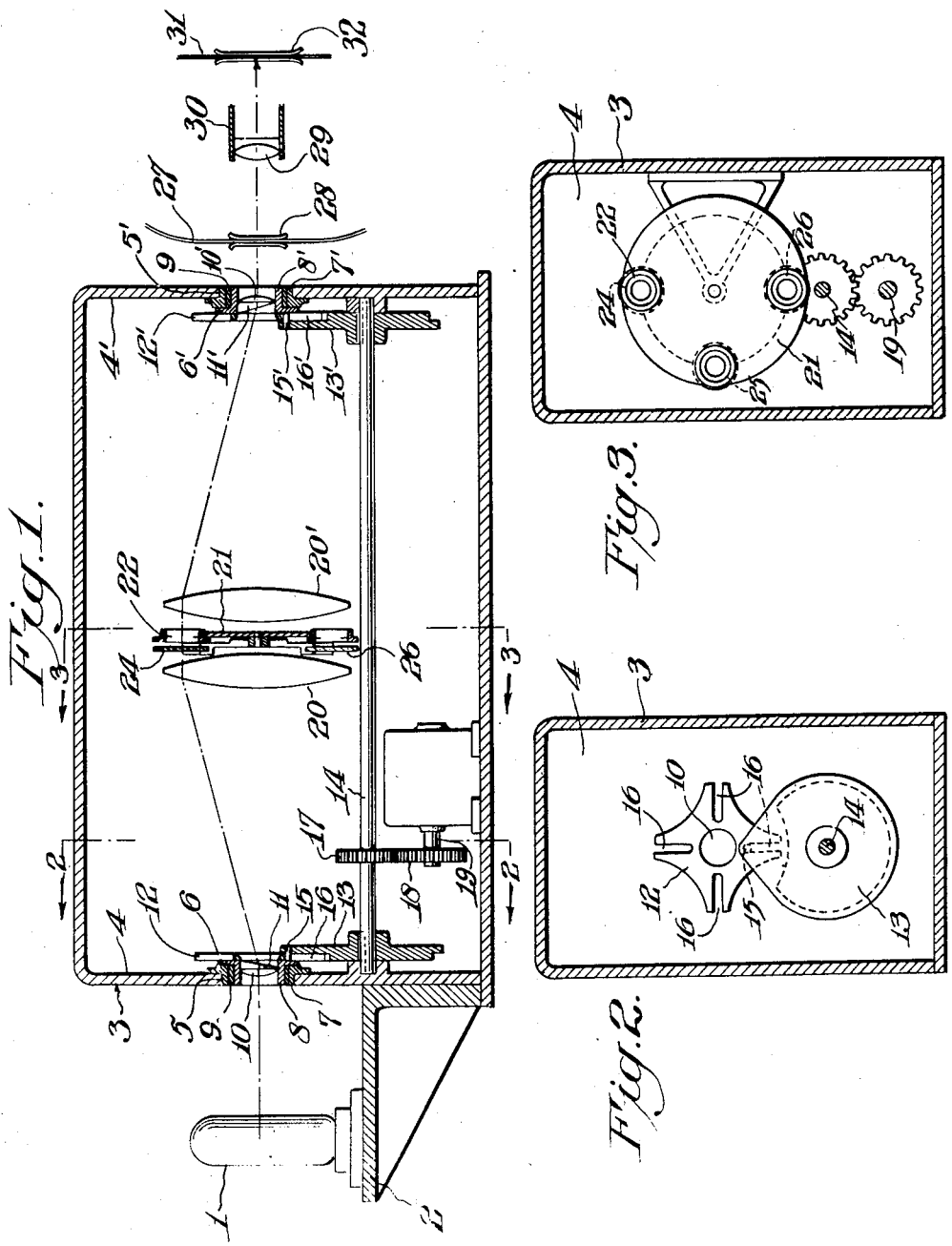
INVENTOR.
Oliver Earle Conklin
BY
Lynn Barratt Morris
ATTORNEY

Patented Apr. 5, 1949

2,466,154

UNITED STATES PATENT OFFICE

2,466,154

OPTICAL COLOR-SEPARATION PRINTER

Oliver Earle Conklin, Parlin, N. J., assignor to E. I. du Pont de Nemours & Company, Wilmington, Del., a corporation of Delaware Application April 17, 1948, Serial No. 21,627

7 Claims. (Cl. 88—24)

This invention relates to a device for reproducing photographic images. More particularly it relates to a device for printing color images from a multicolor transparency onto a light-sensitive photographic element.

An object of this invention is to provide a new optical photographic printing device. A further object is to provide such a device for accurately reproducing color component images of a multicolor image. A still further object is to provide such a device with a few moving parts and a simple optical system. A still further object is to provide such a device which is accurate and can be used for continuous lengths of motion picture film. Still other objects will be apparent from the following description of the invention.

The novel optical printing device of this invention will now be described with reference to the accompanying drawings, in which:

Fig. 1 is an elevation of the printing device with parts in section;

Fig. 2 is an elevation of a rotating lens and prism taken along the line 2—2 of Fig. 1; and Fig. 3 is an elevation of a light-filter sector taken along the line 3—3 of Fig. 1.

The particular embodiment of the invention which is shown in Fig. 1 consists of a lamp 1 which constitutes a source of light and is mounted on a suitable frame 2. A lightproofed housing 3 surrounds the optical system and has two vertical walls 4 and 4' which have openings 5 and 5' for rotatable lens mounts 6 and 6'. The lens mounts are identical in construction but are mounted in opposite directions through the openings in the respective walls. The mounts consist of an outer bearing portion 7 and 7' which are threadably or otherwise firmly affixed in the wall openings. Annular lens mounts 8 and 8' are journaled in the outer bearing portions. Antifriction roller bearings 9 are placed between the inner and outer annular surfaces of members 7 and 8 and 7' and 8'.

The annular lens mounts have lenses 10 and 10' and prisms 11 and 11' disposed therein which form composite light deflecting lenses. The respective lenses and prisms have their adjacent surfaces contacting and in the same vertical plane. The lenses 10 and 10' are plano-convex. The outside surfaces of the prisms are at an angle from the vertical axis. The flat surfaces are adjacent the plane surface of lenses 10 and 10'.

Annular lens mounts 8 and 8' have rigidly attached thereto star wheels 12 and 12' which constitute members of a Geneva stop movement. Driving cam members 13 and 13' for actuating the star wheels are fixedly mounted on a shaft 14. These cams have pins 15 and 15' which are mounted near their peripheries and interfit with cooperating slots 16 and 16' of the respective star wheels. The shaft 14 may be mounted in suitable bearings (not shown). A driven gear 17 is keyed or otherwise fastened to shaft 14. This gear meshes with a driving gear 18 which is mounted on drive shaft 19 which is suitably connected to a source of power.

There are placed between the rotating cooperating lens and prisms two large condensers 20 and 20'. Double-convex lenses or plano-convex lenses are preferably used but one can use meniscus lenses if desired. These condensers are spaced from each other and in the intervening space there is disposed a sector mask 21. This sector consists of three iris diaphragms 22 which are disposed near the circumference of the sector mask and of the condensers 20 and 20'. Two of the iris diaphragms are disposed at an angle of 180° from the optical center of condensers 20 and 20' and the third is at an angle of 90° from the first two. Filters 24, 25, and 26 are placed in front of the iris diaphragms and are colored differently, e. g., blue, green, and red, respectively.

The device just described operates as follows: Light from lamp 1 passes through lens 10 and cooperating prism 11 where it is deflected upwardly to a point near the edge of condenser 20 where it is again deflected and passes horizontally through filter 25 and upper iris diaphragm and condenser 20' where it is deflected downwardly to prism 11' where it is deflected horizontally through lens 10'. When the lens mounts are turned clockwise through a small angle the light is obstructed by sector mask 21 until the angle reaches about 180° where it passes through filter 26 where it is deflected in like manner and passes through lens 10' and prism 11'. When it is turned clockwise through a small angle, the light is obstructed by sector mask 21 until the angle reaches about 270° where it passes through filter 24 and adjacent iris diaphragm and to lens 10' and prism 11' in a similar manner. When it is moved clockwise, a small angle sector mask 21 again stops the passage of light until it reaches iris diaphragm 26.

The principal optical axis of the system is shown in the form of the dash-dot line from the light source through the center of the camera lens when the prism is in the upright position and the light passes through the filter and iris of the upper quadrant. The rotating lens mounts are geared to rotate together. The rotation of the prism 11 causes the beam of light to pass successively through each of the three filters and iris diaphragms. The simultaneous equal rotation of prism 11' straightens the beam so that it passes through film 27 and camera lens onto the light-sensitive film 31. With this arrangement, light beams of the three colors pass in sequence through the picture-bearing film.

For each revolution of the driving cams the star wheel rotates and pauses in each of the four quadrants. During three of the pauses the light beam passes through one of the filters and iris diaphragms. The length of the pause can be varied by the speed of the cam. The openings of the iris diaphragms can be adjusted manually or automatically to give the required exposure through each of the colored light-filters. Once set, the diaphragm openings remain unchanged until there is a change of scene. During the fourth pause the light beam is cut off by the mask and the positive and negative films are shifted during this pause by suitable shifting mechanisms.

The various lenses can be adjustably mounted in conventional manners so as to be adjustable and removable. No mounts are shown for the large condensers for the sake of clarity. They may be in a disk or tube which is adjustably or fixedly mounted on the housing or frame.

A photographic film 27 bearing a multicolor picture is disposed on a film gate 28 whose optical center is on the optical axis of lens 10'. The light from lamp source which passes through the particular filter 24, 25, or 26 passes through the multicolor picture and the color component of such, which is transmitted by such colored printing, light passes through camera lens 29 and appropriate mount 30 where it impinges upon light-sensitive film element 31 which is disposed in a similar gate 32. The film elements are moved in synchronism at the appropriate time by suitable film shifting mechanisms of the type which are common in cameras, projectors, and printing devices.

In the above description and in the drawings, lenses 10 and 10' are cemented to prisms 11 and 11'. However, it is understood that the objects of the invention are also attained if the lenses 10 and 10' are mounted just outside the rotating mount 6 and 6' so that the lenses themselves do not rotate. Also, a group of lenses either rotating or non-rotating may be substituted for the lenses 10 and 10'. The filters, moreover, can be placed anywhere between the spaced prisms on the optical axes to the iris diaphragms but are preferably placed near the large condensers and, more preferably, between the condensers on either side of the sector mask. The filters may be primary color filters, red, green and blue. However, "subtractive" primaries, i. e., yellow, cyan and magenta filters, may be employed for certain printing operations.

While an intermittent mechanical movement has been shown in the form of the invention illustrated in Fig. 1, the invention is not limited to such a construction. The Geneva star wheels 12 and 12' can be replaced by a gear and the cam members 13 and 13' by a gear which meshes with the first gear if desired. The device will then operate continuously, the films being shifted while the light beam is interrupted between the two iris diaphragms.

Since the film shifting mechanisms form no part of the present invention as such, they are not shown for the sake of simplicity. A suitable mechanism is shown in U. S. Patent 1,038,586.

The novel printing device of this invention can be used in numerous ways. For example, it can be used for printing a multicolor negative transparency onto a multilayer monopack positive or it can be used for printing such a negative onto a single layer positive to produce color separation records in successive frames. It can be used to produce triple length (successive frame) separation negatives from monopack color positives. It is also useful in printing from monopack color positive films onto monopack color reversal films. Monopack color films may also be printed from triple length positives or negatives on the device.

An advantage of the device is that it is simple in construction and has few moving parts. Another advantage is that it gives an accurate reproduction and needs little adjustment once the optical system has been set. Another advantage is that the device provides means for carrying out a variety of complete color printing steps in one operation instead of the more usual methods involving three separate printings. A still further advantage is that the device provides means for accurately regulating the spectral composition of a printing light in terms of three primary components while operating from a single light source. The device also provides means for rapid color separation printing from or onto monopack color films.

As many widely different embodiments of this invention can be made without departing from the spirit and scope thereof, it is to be understood that the invention is not to be limited except as defined by the claims.

What is claimed is:

1. An optical printing device comprising a pair of spaced rotatable light deflecting prisms, means for simultaneously rotating said prisms, a pair of spaced large condensers between said prisms, a light mask between said condensers which mask has a plurality of iris diaphragms radially disposed in a cylindrical light-path passing near the periphery of said condensers and colored filters in the optical axes between the prisms so that light from a source passes successively from the first prism through the iris diaphragm and then through the second prism where it is adapted to pass through a picture-bearing film onto a light-sensitive film, said light also passing through said filters.

2. An optical printing device comprising a pair of spaced rotatable light deflecting prisms with associated lenses, means for simultaneously rotating said prisms, a pair of spaced large condensers between said prisms, a light mask between said condensers which mask has a plurality of iris diaphragms radially disposed in a cylindrical light-path passing near the periphery of said condensers, colored filters between the condensers and the iris diaphragm so that light from a source passes from the first prism and associated lens through a combination of a filter and iris diaphragm and then through the second prism and associated lens, where it is adapted to pass through a picture-bearing film onto a light-sensitive film.

3. An optical printing device comprising a pair of spaced rotatable composite light deflecting lenses consisting of a plano-convex lens and a prism having its flat surface adjacent the plane surface of said lens, means for rotating said composite lenses, a pair of spaced large condensers between said rotatable composite lenses, a light mask between said condensers which has a plurality of iris diaphragms radially disposed in a cylindrical light-path passing near the periphery of said condensers, colored filters between the first of said condensers and the iris diaphragm so that light from a source passes successively from the first of said composite light deflecting lenses through said iris diaphragms and then through the second of said composite light deflecting lenses where it is adapted to pass through a picture-bearing film onto a light-sensitive film.

4. An optical printing device comprising a pair of spaced rotatable composite light deflecting lenses consisting of a plano-convex lens and a prism having its flat surface adjacent the plane surface of said lens, means for rotating said composite lenses with regular intermittent pauses, a pair of spaced large condensers between said rotatable composite lenses, a light mask between said condensers which has a plurality of iris diaphragms radially disposed in a cylindrical light-path passing near the periphery of said condensers, colored filters between the first of said condensers and the iris diaphragm so that light from a source passes successively from the first of said composite light deflecting lenses through said iris diaphragms and then through the second of said composite light deflecting lenses where it is adapted to pass through a multicolor picture-bearing film onto a light-sensitive film.

5. An optical printing device comprising a pair of spaced rotatable composite light deflecting lenses consisting of a plano-convex lens and a prism having its flat surface adjacent the plane surface of said lens which have their optical axis on the same horizontal rectilinear locus, said lenses each being mounted in the center of a Geneva star wheel with four quadrants, cams for rotating said wheels, a pair of spaced large condensers between said rotatable composite lenses, a light mask between said condensers which has a plurality of iris diaphragms disposed in a cylindrical light-path passing near the periphery of said condensers in three quadrants, two of the diaphragms being 180° from each other and the third at 90° from said two, three differently colored light filters between the first condenser and the respective diaphragm, means for continuously rotating said cams whereby the star wheels rotate and pause intermittently so that light passes successively from the first of said composite light deflecting lenses successively through each of said filters and then through the second of said composite light deflecting lenses where it is adapted to pass through a multicolor picture-bearing film onto a light-sensitive film.

6. A device as set forth in claim 2 wherein blue, green, and red filters are used.

7. A device as set forth in claim 2 wherein during the movement of the star wheels into a fourth quadrant, light is blocked from passing through said device whereby said films can be shifted during the period the light is so blocked.

OLIVER EARLE CONKLIN.

REFERENCES CITED

The following references are of record in the file of this patent:

UNITED STATES PATENTS

| Number | Name | Date |
|---|---|---|
| 1,894,265 | Chretien | Jan. 17, 1933 |
| 2,061,088 | Rantsch | Nov. 17, 1936 |